United States Patent
Howatt

[15] 3,635,759
[45] Jan. 18, 1972

[54] METHOD OF ELIMINATING VOIDS IN CERAMIC BODIES

[72] Inventor: Glenn N. Howatt, Metuchen, N.J.
[73] Assignee: Gulton Industries, Inc., Metuchen, N.J.
[22] Filed: Apr. 4, 1969
[21] Appl. No.: 813,472

[52] U.S. Cl. ................117/212, 29/25.42, 117/61, 117/62, 117/70, 117/70 A, 117/119, 117/217
[51] Int. Cl. ........................................H01g 13/04
[58] Field of Search...............117/70, 70 A, 71, 62, 215, 117/212, 119, 61; 118/50; 29/25.42

[56] References Cited

UNITED STATES PATENTS

| | | | |
|---|---|---|---|
| 3,380,854 | 4/1968 | Robinson | 29/25.42 X |
| 3,332,817 | 7/1967 | Obenhass | 29/25.42 X |
| 3,054,035 | 9/1962 | Howatt | 29/25.42 X |
| 2,707,158 | 4/1955 | Hans Van Isson | 117/61 X |
| 2,470,111 | 5/1949 | Rubissow | 117/119 X |

Primary Examiner—Alfred L. Leavitt
Assistant Examiner—Alan Grimaldi
Attorney—Wallenstein, Spangenberg, Hattis & Strampel

[57] ABSTRACT

A method of making a high-density monolithic ceramic body where the body comprises a multiplicity of ceramic layers with one or more metallic coatings or layers on predetermined ceramic layers inside the body, each coated layer being initially separately formed by applying a flowable mixture of raw ceramic particles, binder and solvent upon a support surface or subjacent dried metal coated ceramic layer, drying the same, applying a metallic coating to the previously dried layer of ceramic material, drying the same, and repeating these operations until a lamina of desired thickness is formed having the appropriate number of interleaved metallic coatings. During the formation of the lamina, gross voids caused by the dripping of solvent into the subjacent layer or layers and replacement thereby by air are eliminated by providing the support surface with small air suction openings through which flowable ceramic cannot pass and drawing air through the one or more dried layers to eliminate the formation of air pockets in the uppermost flowable ceramic material by preventing air from within the porous dried subjacent layer from displacing the solvent in the flowable layer. Voids formed in the process of firing raw ceramic bodies with metallic coatings or layers therein, whether formed by the above or other processes, are reduced or eliminated after the raw ceramic firing operation by a process involving the initial complete encasement of the metallic coatings or layers by raw ceramic material before the firing operation so that after the firing operation the metallic coatings are completely encased by a gastight shell or cured ceramic material. The fired bodies of ceramic material are then placed in a pressure chamber and heated therein to a temperature which softens the ceramic body so that pressure on the shell compresses and compacts the body of ceramic material to increase its density.

11 Claims, 8 Drawing Figures

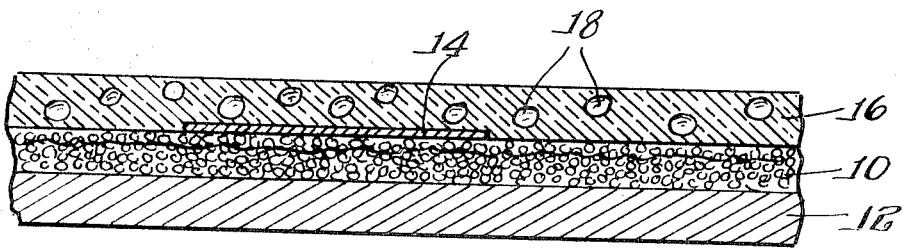
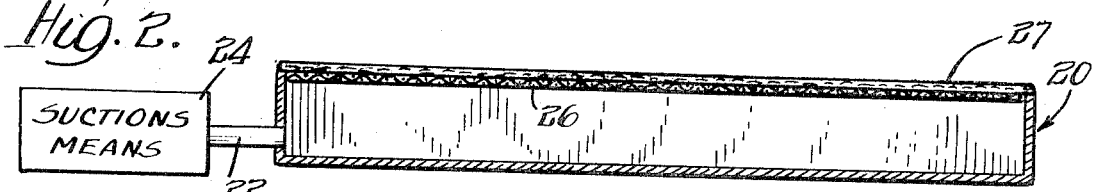
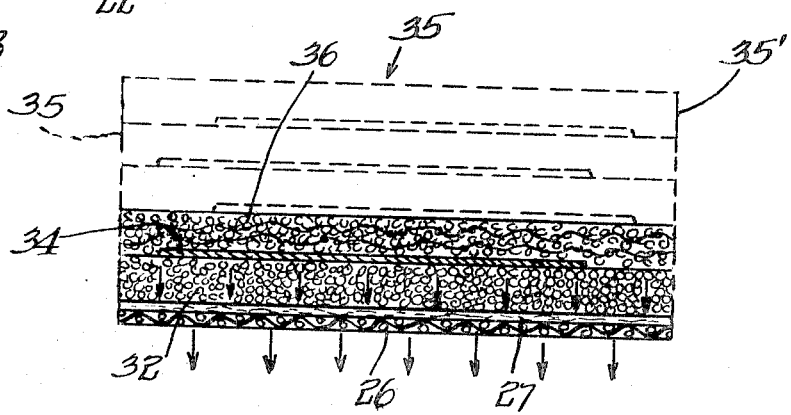
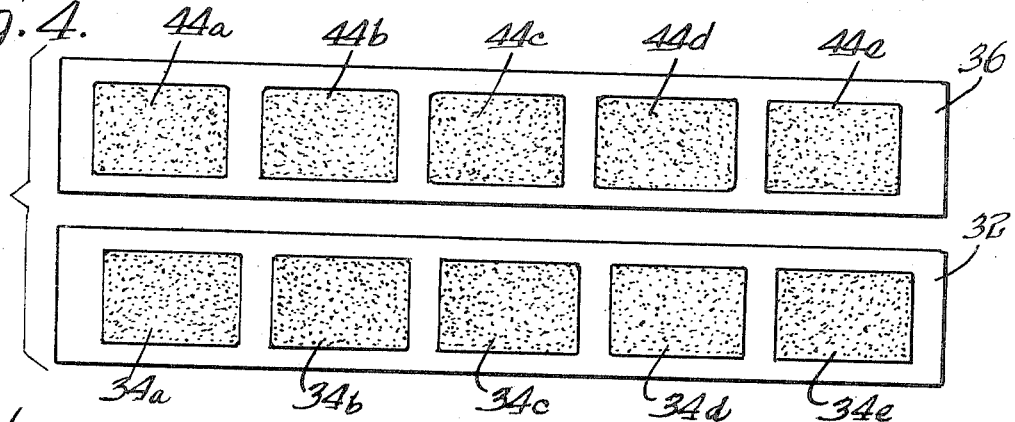
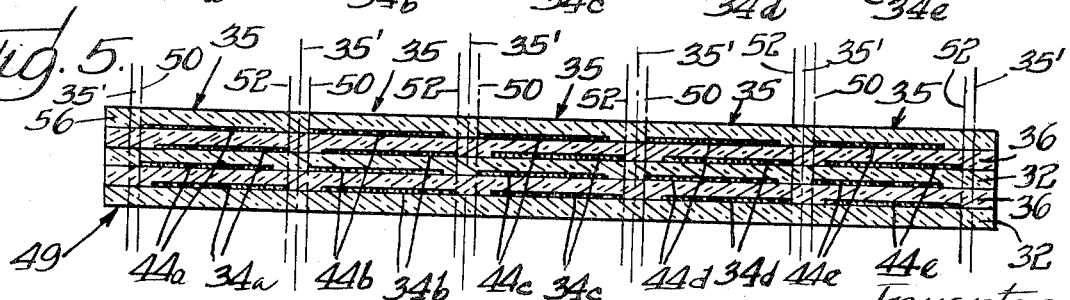

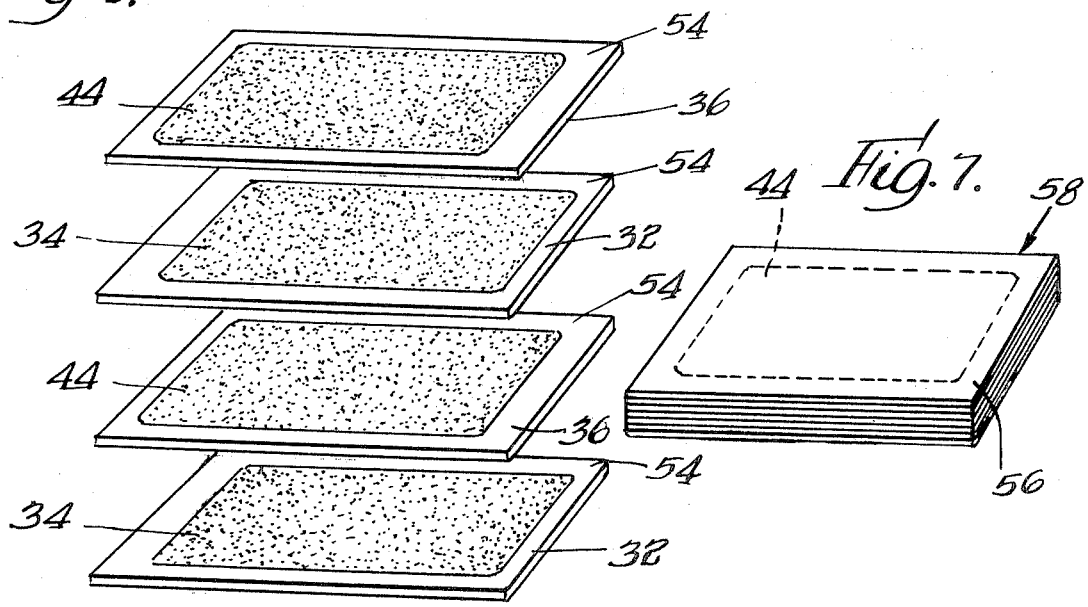
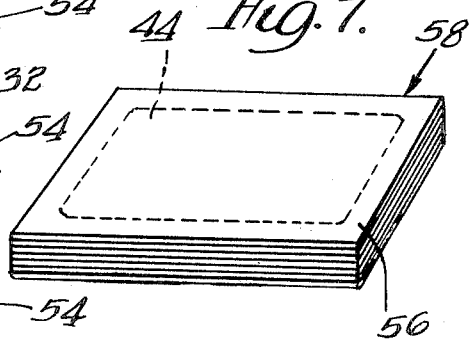
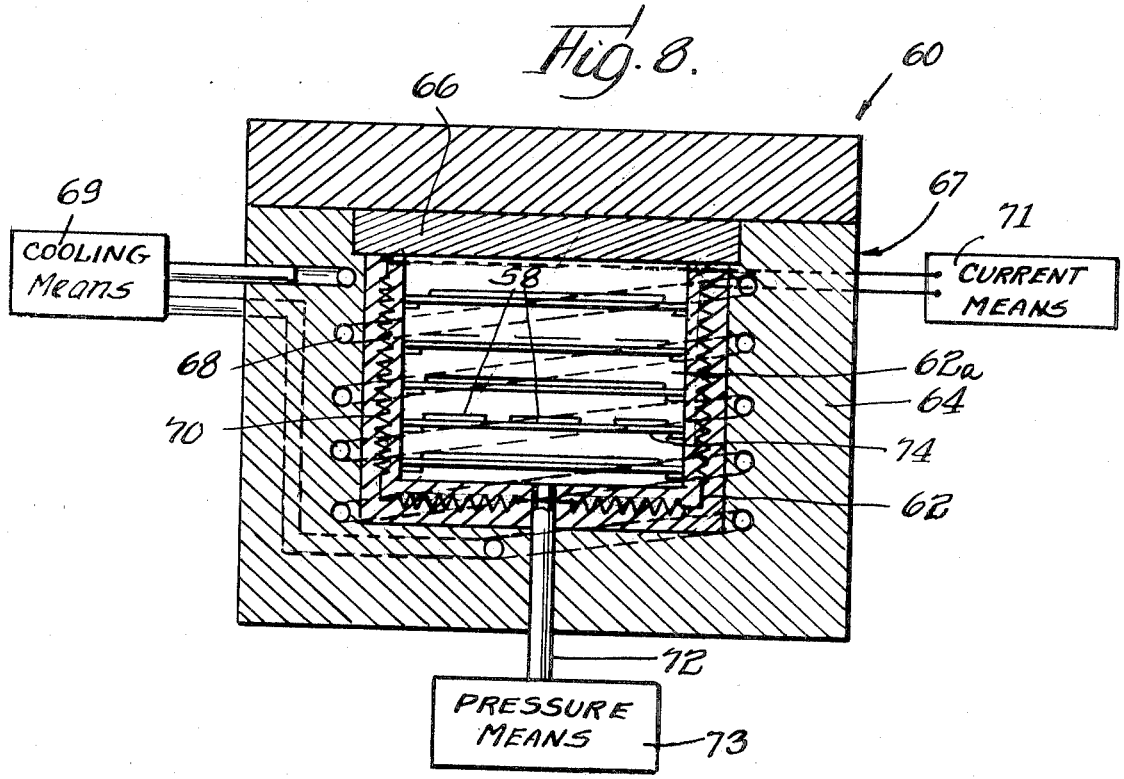

METHOD OF ELIMINATING VOIDS IN CERAMIC BODIES

This invention relates generally to a method of forming ceramic components, and more particularly to forming ceramic components of the type having metallic coatings or layers therein serving as electrodes for such electrical devices as multilayer capacitors or transducers. Specifically, this invention is directed to a method of forming internally electroded multilayered monolithic ceramic bodies of high uniform density.

Prior processes of manufacturing internally electroded multilayered ceramic components or bodies sometimes produce bodies with reasonable uniformity and density, but these processes have many disadvantages one of which is the relative cumbersome operations necessary to produce highly uniform internally electroded multilayered ceramic bodies. During the curing and sintering of raw ceramic material, by firing the same at high temperature, small voids are formed within the ceramic body as a result of driving off the heat-volatile binder used in the raw ceramic material at the high curing and sintering temperatures involved. One method of the prior art which eliminates or reduces the small or minute voids is disclosed in my patent, U.S. Pat. No. 3,054,035 issued Sept. 11, 1962. In this patent a ceramic body is placed in a metal shell which forms a sealed casing about the body and the assembly is heated under pressure to compress the casing and compact the ceramic material to form a more dense body by reducing the minute voids. This method produces good results but requires the additional step of encasing the ceramic body and thereafter removing part or all of the casing material to expose the ceramic body.

Where the ceramic bodies are made by spraying or squeegeeing successive layers of raw material on previously dried metal coated layers, the prior processes produced, upon the firing operation which cures and sinters the raw ceramic material, deformed ceramic bodies because of the filling during such operation of the relatively large air pockets or voids previously formed within the material by the displacement by air of solvent dripping down into the previously dried porous subjacent layers of ceramic material.

Accordingly, one of the objects of this invention is to provide a method of manufacturing multilayered internally electroded ceramic bodies which densифy such bodies using less cumbersome methods than the prior art.

Another object of this invention is to provide a method of manufacturing multilayered internally electroded monolithic ceramic bodies by the spray or squeegeeing process described where the bodies can be fired without deforming the bodies.

Briefly, one of the aspects of this invention eliminates the formation of gross voids within the layer of flowable ceramic material in the spray or squeegeeing method of making multilayered internally electroded ceramic bodies by subjecting the subjacent dried porous layer or layers of ceramic material to suction to prevent the upward flow of air into the flowable layer as the solvent therein drops downward into the dried porous layer or layers. An air pervious, flowable ceramic material impervious, support surface is provided upon which the first layer of flowable raw ceramic material is applied by either spraying, screening or doctor blading. Most advantageously, the support surface may be formed by a fine-mesh screen over which is positioned a filter paper. The first layer of ceramic material is formed by applying, as for example, by spraying or squeegeeing through a silk screen or other meshed element, a freely flowable slurry of the ceramic mixture onto the support surface so as to completely cover a desired area of the support surface, with or without suction applied thereto. This first layer is dried thereby removing the solvent from the mixture and leaving behind a pliable porous layer of ceramic particles and heat-volatile binder. Thereafter, to only a portion of the dried layer is applied an electrode-forming coating of finely divided metal particles usually of platinum or the like and a liquid carrier to maintain this mixture in a fluid condition. The metallic coating is then dried. If suction was previously applied it is then continuously applied to the underside of the support surface to remove air within the dried porous layer of coating while the next layer of flowable ceramic material is sprayed or squeegeed over the dried ceramic layer and metallic coating and is dried thereon. When the solvent from the just-applied layer drops into the subjacent dried layer, the solvent is not displaced by air and the formation of gross voids is eliminated. The process is repeated for each successive layer of the applied slurry mixture, the result being a more dense and more uniform raw ceramic body which is not deformed during the firing thereof.

Another aspect of this invention is to completely encase in raw ceramic material the metallic coatings or layers to be ultimately exposed, whether made by the spraying or squeegeeing process or by any other process, so that during the subsequent firing operation the ceramic material forms a gastight casing completely about the one or more metallic coatings or layers involved. When the ceramic body is fired, the heat-volatile binder in the raw ceramic material is driven off forming minute voids sealed within the ceramic material. This aspect of the invention reduces or eliminates these minute voids by a final operation following the sintering operation comprising subjecting the ceramic body to gas pressure and heat sufficient only to cause the ceramic material to become pliable to compress the externally sealed ceramic encased body to form a more dense monolithic uniform ceramic body. After this final forming operation, the ceramic body is cooled and the peripheral edges of each group of alternate metallic coatings are exposed as by cutting or grinding to form electrical contact regions for making electrical connections between and/or to the metallic coatings.

Other objects, advantages and features of this invention will be more fully realized and understood from the following detailed description when taken in conjunction with the accompanying drawings wherein like reference numerals throughout the various views of the drawings are intended to designate similar elements or components.

FIG. 1 is an elevational sectional view showing the application of a slurry of flowable raw ceramic material on a subjacent metal-coated dried layer of such raw ceramic material with gross voids formed in the flowable layer;

FIG. 2 is an elevational sectional view of a suction box with one wall thereof being foraminous and previous to air upon which a plurality of layers of ceramic material are sequentially formed in accordance with the invention;

FIG. 3 is an enlarged sectional view of a ceramic laminate body formed on the air-pervious wall of FIG. 2;

FIG. 4 is a plan view of raw ceramic layers with predetermined areas covered with a metallic coating to form plates of a capacitor;

FIG. 5 is an elevational sectional view of a laminate body formed by a plurality of the ceramic layers shown in FIG. 4 and from which a plurality of capacitor-forming stacks are to be formed and cut therefrom;

FIG. 6 is an exploded perspective view of the coated layers of a capacitor stack cut from the laminate body of FIG. 5;

FIG. 7 is a perspective view of a capacitor stack cut from the laminate body of FIG. 5; and FIG. 8 is a cross-sectional diagrammatic view of a processing chamber utilized for processing fired ceramic components in accordance with one aspect of this invention.

FIG. 1 illustrates a prior art method of forming multilayered ceramic bodies having metallic coatings therein. A first layer 10 of ceramic material containing finely divided ceramic particles, a heat-volatile binder and a solvent is deposited, as by spraying or squeegeeing or the like, on a support surface 12, the layer 10 being initially in a flowable condition so as to flow to a uniform thickness on the support surface 12. The thickness of each layer 10 may be typically in a range of from 0.001 to 0.1 centimeters. The layer 10 is dried by any suitable means, as for example by air drying or the application of heat. An electrode layer preferably in the form of a metallic coating 14 is deposited on the exposed surface of the first dried layer 10 and is also dried. To the exposed dried layer 10 and the metallic coating 14 is applied a second layer 16 of flowable raw ceramic material which is of the same mixture as the first layer when it was applied in the flowable condition. However, because of the porous condition of the dried layers 10 and 14 the solvent from within the flowable layer 16 will drop downward into the porous dried layer 10 and the air from within the porous dried layer 10 will flow upward to displace the downward flowing solvent, the result being a formation of gross voids indicated by a plurality of air pockets 18. The gross voids cause deformations in the ceramic body during the firing operation, which cures and sinters the raw ceramic particles, as the gross voids become filled with ceramic material.

Referring now to FIG. 2, there is seen one kind of apparatus which can be used to form raw multilayered ceramic bodies free of gross voids in accordance with this invention. The apparatus includes a suction box 20 which has a passage 22 connected to a suction means 24. One wall of the suction box 20 is a support wall or surface 26 which may be formed by a finely apertured support wire or screen or the like upon which is most advantageously placed a filter paper 27 to form a foraminous air pervious, flowable, ceramic material impervious support wall. A slurry of raw ceramic material of the above-mentioned mixture is applied to the filter paper 27 by spraying or squeegeeing to the desired thickness and thereafter dried by any suitable means.

Referring now to FIG. 3 there is illustrated diagrammatically an enlarged fragmentary view of a raw, multilayered capacitor-forming ceramic body with interleaved electrode coatings which are formed in accordance with this invention. The first two ceramic layers and the first electrode coatings are shown in solid lines with additional ceramic layers and electrode coatings being added, when desired, and shown in dotted lines. Any number of additional ceramic layers and electrode coatings can be formed. Here, a first layer 32 of ceramic material comprising a mixture of finely divided raw ceramic particles, a heat-volatile binder and a solvent is applied on the filter paper 27 supported by the foraminous wall 26. The ceramic layer 32 is dried to remove the solvent thereby causing the layer 32 to become substantially self-supporting and porous. During the drying of the first layer 32 air is drawn by suction as indicated by the downwardly directed arrowed lines below the foraminous wall 26. To the upper exposed surface of the layer 32 is applied a metallic coating 34, to form one capacitor plate within a capacitor stack 35 indicated between the vertical broken lines 35'—35'. The metallic coating when dried is porous so that the suction applied to the bottom surface of the support wall 26 is effective through this coating and through the subjacent layer of dried porous ceramic material. After the metallic coating 34 is dried, suction is maintained at the bottom surface of the foraminous wall 26 and is effective through the porous dried layer 32 and metal coating to remove air therefrom as indicated by the downwardly directed arrowed lines within the layer 32. A second layer 36 of flowable ceramic material comprising a mixture of finely divided ceramic particles, a heat-volatile binder and a solvent is applied to the exposed dried surfaces of the first layer 32 and the metallic coating 34. The solvent within the flowable layer 36 will drop downwardly into the dried porous layer 32 but air from within the dried layer 32 will not flow upwardly due to the effect of the suction. The suction is maintained at least until the flowable layer 36 has dried. The layer 36 is then dried thereby forming part of a multilayered ceramic body with an electrode coating therein and which is completely free of gross voids. The process of applying alternate conductive coatings and ceramic layers can be repeated as many times as necessary to build up a ceramic body having the desired number of layers.

The capacitor-forming stack 35 is preferably initially formed within a larger laminate structure containing a plurality of similar capacitor-forming stacks which are arranged in accordance with another aspect of this invention so as to be cut from the laminate structure without exposing edge portions of any of the metallic coatings. This is best illustrated by referring to FIG. 4, 5, 6 and 7. FIG. 4 illustrates the ceramic layers 32 and 36 which are located one on top of the other over the support surface 26 on the filter paper 27 but are shown side by side on the drawing. The layers 32 and 36 are of sufficient lengths to form a plurality of laterally displaced capacitor-forming stacks 35, it being understood that the layers 32 and 36 may be of any width or length to provide any number of capacitor-forming stacks. The layer 32 of ceramic material has a plurality of thin metallic coatings 34a–34e which can be applied to discrete areas of the layer 32 by means of spraying, screening or doctor blading. Here, each of the conductive areas 34a–34e forms a single capacitor plate of a corresponding group of capacitor plates which are formed within the capacitor-forming stack 35, as best seen in FIG. 5. The ceramic layer 36 has formed thereon a plurality of thin metallic coatings 44a–44e preferably of the same type of material which forms the metallic coatings 34a–34e, and the coatings 44a–44e also form single capacitor plates within their corresponding capacitor-forming stacks 35. As mentioned hereinabove, the successive ceramic layers and metallic coatings are formed by spraying or the like one on top of the other, the result being a finished laminate structure 49 from which the capacitor-forming stack 35 are cut before or after the subsequent firing operation. Any number of a pair of layers 32 and 36 may be formed to provide capacitors or other electronic components of particular electrical characteristics.

In accordance with another aspect of this invention voids developed during the firing of raw ceramic laminate bodies with conductive coatings therein, whether made by the spraying or squeegeeing process or by any other process, are reduced or eliminated by encasing the coatings completely with ceramic material before firing and then subsequently applying heat and pressure to the ceramic bodies in a manner to be described. To provide the ceramic encasement referred to, the layers 32 and 36 are preferably arranged in the manner shown in FIG. 5. As there shown the conductive coatings 44a–44e are alternate coatings placed in registry one with the other to form one group of capacitor plates and the conductive coatings 34a–34e are interleaved therebetween to form another group of capacitor plates with portions thereof respectively in registry with the coatings 44a–44e. The coatings 44a–44e are displaced laterally in at least one direction from the coatings 34a–34e and terminate in common planes 50 and 52 at which the corresponding metallic coatings of the two groups of coatings can be connected together to form a multiplate capacitor. This is true for each of the capacitor-forming stacks 35. Preferably, each of the metallic coatings on a given layer of ceramic material is sufficiently displaced in a lateral direction to provide a margin completely of ceramic material about each of the conductive coatings within its respective capacitor stack. This is best illustrated in FIG. 6 which is an exploded perspective view of some of the layers 32 and 36 with their respective conductive coatings 34 and 44. Here it is clearly illustrated that each of the conductive coatings has a margin 54 of ceramic material completely surrounding the coatings. Therefore, when a final layer 56 of ceramic material is formed on top of the uppermost layer 36 of ceramic material to cover the last plurality of metallic coatings 44a–44e, each of the capacitor stacks formed within the laminate structure 49 is completely encased by ceramic material. This is best illustrated in FIG. 7 which shows a multilayered ceramic body 58 formed by one of the capacitor-forming stacks 35 severed along adjacent planes identified by lines 35'—35' from the laminate structure 49 in FIG. 5.

The multilayered ceramic body 58 is then fired to cure and sinter the ceramic particles in the conventional way and is then further processed to reduce minute voids formed during the firing and curing operation by heating and gas-pressurizing the fired ceramic body only to soften and compress the same through the gastight ceramic casing surrounding the conductive coatings.

The latter processing operation may be carried out by the exemplary apparatus 60 shown in FIG. 8. The apparatus 60 in cludes an inner pressurizable enclosure 62 having an open top chamber 62a with a cover 66 thereon. The inner enclosure is located within an outer enclosure 64. The source 73 of gas pressure is connected by a pipe 72 to the chamber 62a. The walls of the enclosure 62 may contain heating elements 70 energized by current means 71 and the walls of the outer enclosure may contain cooling coils 68 in which a cooling fluid is circulated by a cooling means 69. A plurality of capacitor-forming bodies 58 are shown placed within the chamber 62a upon support racks 74. The heating elements raise the temperature within the chamber 62a sufficiently only to soften the sintered previously fired ceramic bodies. When the ceramic material involved is barium titanate, the temperature may be 1,100°-1,380° C. The cooling coils 68 maintain the outer enclosure 64 at a modest temperature. Before or after the temperature within the chamber 62a reaches the softening temperature of the ceramic material, gas under pressure, such as pressures of the order of 5,000 to 20,000 pounds per square inch, is introduced into the chamber 62a through the pressure pipe 72 to apply uniform gas pressure about the self-forming ceramic casing to compress the casing and the ceramic and conductive material therein. After maintaining the temperature and pressure at the desired levels for a time, for example 30 minutes, more or less, the pressure is removed, the heat is turned off and the parts are cooled to room temperature. The ceramic bodies 58 when removed from the chamber 62 are of high density and high uniformity and generally of greatly improved quality as compared to ceramic bodies made by processes of the prior art. The ceramic bodies 58 are then cut along the planes 50-52 in FIG. 5 to expose the edges of the conductive coatings. These exposed edges are then electroded to form capacitor terminals.

It will be understood that variations and modifications may be effected in the exemplary form of the invention without departing from the broad aspects of the invention.

I claim:

1. A method of making a high-density multilayered ceramic body with one or more metallic layers therein, comprising the steps of: depositing upon an air pervious support wall a first layer comprising a mixture of raw ceramic particles, a heat-volatile binder and a solvent forming a flowable mixture which cannot pass through the air pervious support wall; drying the first layer to remove the solvent; applying a first metallic coating to only part of the first layer of ceramic material and drying the same; depositing a second layer of said mixture of raw ceramic particles, a heat-volatile binder and a solvent upon said metallic coated first layer; sucking air through the air-pervious support wall and from said dried first layer to prevent air pockets from forming in said second layer; drying said second layer to remove said solvent; forming additional metallic coating and ceramic layers where desired in the same manner as said second ceramic layer and first metallic coating; and then firing the resultant dried body to remove the binder and to sinter and cure the ceramic particles to form a monolithic ceramic body free of any gross voids.

2. The method of making a high-density monolithic ceramic body according to claim 1 wherein said metallic coatings are completely surrounded on all sides by said ceramic layers, wherein said sintering and curing step form around said metallic coatings a gastight casing of ceramic material, and then subjecting the same to heat and gas pressure which softens the ceramic particles and squeezes the same by said gas pressure applied around said gastight casing to reduce or eliminate the minute voids in the same.

3. The method of making a high-density monolithic ceramic body according to claim 1 wherein said plurality of layers are stacked one on top the other such that certain edge portions of a first group of alternate thin metallic coatings are in registry to form a first common contact region and certain edge portions of a second group of alternate thin metallic coatings interleaved with said first group are in registry to form a second common contact region.

4. The method of making a high-density monolithic ceramic body according to claim 2 which further includes the step of heating said laminate under pressure to a temperature only sufficient to soften said ceramic particles and to compress the same into a high-density monolithic ceramic body following the firing of the body.

5. The method of making a high-density monolithic ceramic body according to claim 4 further including the step of exposing said certain edge portion of said first and second groups of thin metallic coatings such that the edge portions of each respective group can be e electrically connected together.

6. A method of making high-density monolithic ceramic capacitor bodies, comprising the steps of: depositing upon an air-pervious support wall a first layer comprising a mixture of finely divided raw ceramic particles, a heat-volatile binder and a solvent forming a flowable mixture which cannot pass through air-pervious support wall; drying said first layer to remove the solvent; depositing on one surface of said first dried layer a first plurality of thin metallic coatings in a predetermined pattern to form a capacitor plate for a plurality of capacitor stacks, said metallic coatings being displaced one from the other in at least one direction; removing air from within said first dried layer by suction applied to the opposite side of said support wall while applying over said first layer and said metallic coating a second layer of said mixture of finely divided raw ceramic particles, a heat-volatile binder and a solvent; depositing on the exposed surface of said second layer a second plurality of thin metallic coatings slightly displaced in at least one lateral direction from said predetermined pattern to form another capacitor plate for said plurality of capacitor stacks; forming upon said second metal coated layer additional raw ceramic layers and metallic coatings where desired in the same manner as said second ceramic layer while said suction is applied and said second plurality of thin metallic coatings to form a laminate body where said metallic coatings on each ceramic layer has portions thereof in general registry with portions of corresponding metallic coatings of other ceramic layers to form respective capacitor stacks where the metallic coatings of each capacitor stack are spaced in nonoverlapping relation from the metallic coatings of the adjacent capacitor stacks and wherein certain edge portions of a first group of alternate metallic coatings in each capacitor stack are in registry to form a first common contact region and certain edge portions of a second group of alternate metallic coatings in each capacitor stack are in registry to form a second common contact region; and cutting through only the ceramic material between said capacitor stacks to separate the same into separate capacitor elements where the metallic coatings are completely encased by ceramic material.

7. The method of making high-density monolithic capacitor bodies according to claim 6 further including the step of firing said capacitor stacks to sinter and cure the ceramic particles therein to form monolithic ceramic capacitor bodies free of gross voids.

8. The method of making high-density monolithic capacitor bodies according to claim 7 wherein said firing step forms around said capacitor stacks a gastight casing of ceramic material, and then after said cutting step subjecting said separated capacitor stacks to heat and gas pressure which softens the ceramic material and squeezes the same by said gas pressure applied around said gastight casing to compress and compact the same to reduce or eliminate minute voids therein.

9. The method of making a high-density monolithic ceramic capacitor bodies according to claim 8 further including the step of exposing said certain edge portions of said first and second groups of thin metallic coatings such that the exposed edge portions of each respective group can be electrically connected together to form a multiplate capacitor.

10. The method of making high-density monolithic ceramic capacitor bodies according to claim 8 further including the step of exposing said certain edge portions of said first and second groups of thin metallic coatings such that the exposed edge portions of each respective group can be electrically connected together to form a multiplate capacitor.

11. A method of making a high-density multilayered ceramic body with one or more metallic coatings therein, comprising the steps of: forming a laminate body of raw ceramic layers and at least one metallic layer completely embedded within the raw ceramic layers and having an edge portion to be ultimately exposed; firing the resultant laminate body to sinter and cure the raw ceramic material and to form around said metallic layer a gastight casing of ceramic material then subjecting said laminate body to gas pressure and a temperature below the firing temperature thereof only to soften the ceramic material and squeeze the same by said gas pressure applied around said gastight casing to reduce minute voids therein; and then exposing said edge portion of each of the one or more metallic layers within the ceramic body.

* * * * *